United States Patent [19]

Iio et al.

[11] 4,389,248

[45] Jun. 21, 1983

[54] METHOD OF RECOVERING GOLD FROM ANODE SLIMES

[75] Inventors: Toshimasa Iio; Toyokazu Ohkubo, both of Niihama, Japan

[73] Assignee: Sumitomo Metal Mining Company Limited, Tokyo, Japan

[21] Appl. No.: 317,640

[22] Filed: Nov. 2, 1981

[30] Foreign Application Priority Data

Nov. 18, 1980 [JP] Japan .................................. 55/162153

[51] Int. Cl.$^3$ ............................................. C22B 11/00
[52] U.S. Cl. ..................................... 75/99; 75/118 R; 423/40; 423/41; 423/509
[58] Field of Search ............................... 75/99, 118 R; 204/DIG. 13; 423/40, 41, 509

[56] References Cited

U.S. PATENT DOCUMENTS 4,094,668  6/1978  Yannopoulos et al. ................. 75/99

OTHER PUBLICATIONS

Habashi Fathi, *Principles of Extractive Metallurgy* vol. 2, 1970 pp. 39, 199, 139–142.
Safanov, V. V.; Lyatkina et al., Tr. *Mosk. Khim.-Tekhnol Inst.* 1969, 161–164 (Russ.), abstracted in *Chem. Abs.* vol. 75, 93960z.
Mellor, J. W. *Inorganic and Theoretical Chemistry* vol. 3, 1928, pp. 596 and 602.

*Primary Examiner*—Brian E. Hearn
*Assistant Examiner*—Robert L. Stoll
*Attorney, Agent, or Firm*—Watson, Cole, Grindle & Watson

[57] ABSTRACT

A method of recovering gold from anode slimes resulting from electrolytic copper refining comprises treating the anode slimes to remove copper and selenium, forming an aqueous slurry from the treated slimes, blowing chlorine gas into the aqueous slurry to dissolve the gold therein, and separating the so-dissolved gold from the residue.

18 Claims, No Drawings

METHOD OF RECOVERING GOLD FROM ANODE SLIMES

BACKGROUND OF THE INVENTION

1. Field of the Invention

The present invention relates to a method of treating the anode slimes which are generated during electrolytic copper refining, and more particularly to a method of treating the anode slimes so as to recover the gold content therein.

2. Description of the Prior Art

Anode slimes which are generated when crude copper is electrolytically refined consist mostly of those impurities originally contained in the copper anode which are insoluble in the electrolyte. Such anode slimes, which will either remain on the copper anode or settle to the bottom of the electrolytic tank, normally contains not only numerous valuable metals, including gold, silver, selenium, tellurium, lead, and metals of the platinum group but copper accompanied.

Various methods for recovering the valuable metals from such slimes are known. These methods utilize the steps of copper and selenium removal, smelting, volatilization, cupellation, silver electrolysis and gold electrolysis in noted order. Since the gold recovery step is usually preceded by other metal recovery steps, each of which needs to take one to five days to complete, the gold recovery step may not be commenced for two to three weeks. And because the gold will have been contained in the matte and slag during the prior smelting step, and also into the litharge of the cupellation step, repeated treatments of these products will be required to recover the gold therefrom, thus lengthening the time period needed to recover all the gold from the initial anode slimes.

It is thus an object of the present invention to eliminate the noted drawbacks of the prior art and to provide a simple, quick and effective method for the recovery of the gold from anode slimes generated during electrolytic copper refining.

SUMMARY OF THE INVENTION

According to the present invention the anode slimes generated during electrolytic copper refining is first treated to remove the copper and selenium therefrom, then the slimes are dispersed in water to form an aqueous slurry, chlorine gas is subsequently blown into the aqueous slurry so as to dissolve the gold, and finally the dissolved gold is separated from the residue. These method steps, accomplished in sequence, enable the gold in the anode slimes to be recovered simply, quickly and effectively.

DETAILED DESCRIPTION OF THE INVENTION

The first step of the inventive method is to remove the copper and selenium from the anode slimes. Such methods are in themselves well known. (Refer to, for example, page 40 of the literature "Flow Charts and Capacity of Copper Refining Operation", October 1978 published by Japan Mining & Industry Association.)

One technique for removing these metals from the anode slimes is to react the slimes with dilute sulfuric acid, and air or oxygen, or to react the slimes with concentrated sulfuric acid, then extracting the reacted slimes with water. The reaction is carried out in a vessel either under atmospheric pressure or else under an elevated pressure and temperature. Thus the copper is dissolved from the slimes. Next, the residue is oxidized by roasting at temperatures of 600° C. to 800° C. so as to volatilize the selenium therein as selenium dioxide.

Another technique is to react the anode slimes with either an acid or an alkali and with air or oxygen in an autoclave at a high temperature and under elevated pressure. If an acid is used, the reaction is carried out at a higher temperature than is used when the sulfuric acid treatment techniques (discussed above) are used, and copper and selenium can be simultaneously dissolved from the slimes. If an alkali is used, selenium is dissolved in the alkaline solution while copper is extracted from the residue with dilute sulfuric acid.

A further technique is to oxidize the anode slimes by roasting (either in the presence or absence of concentrated sulfuric acid) to volatilize the selenium as selenium oxide and then to extract the copper from the roasted slimes with water or dilute sulfuric acid.

A still further technique which can be used is disclosed in the applicants' Japanese Patent Application No. 148506/1980, filed Oct. 23, 1980. In this technique free sulfuric acid is removed from the slimes to the greatest possible extent and thereafter an aqueous slurry containing the slimes is treated with air or oxygen at a high temperature and under a high pressure in a vessel so as to convert the copper and selenium to an acid-soluble substances. The copper and selenium are then extracted with sulfuric acid.

In any event, according to the present invention the initial removal of the copper and selenium from the anode slimes is performed in order to prevent simultaneous dissolution of these metals when the gold is subsequently dissolved from the slimes. Their removal also facilitates the separation of the other remaining metals from the slimes at a later time.

Moreover, the noted treatments of the anode slimes for the removal of copper and selenium therefrom also performs the removal of any organic additives which may be present in the anode slimes, these organic additives, e.g., glue, pulp waste or casein, being initially present in the electrolyte. In this regard, it is desirable to remove these additives from the anode slimes prior to the treatment of the aqueous slurry of anode slimes with chlorine gas according to the present invention because, if present, the chlorine gas will be reduced by the organic additives (the organic additives being likewise oxidized) to form chloride ions, and these chloride ions will react by the following reactions with silver chloride which has been formed by chlorination, so that the silver chloride will be dissolved in the form of complex ions:

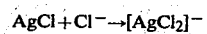

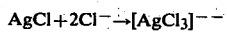

Similar reactions will dissolve any lead in the form of lead ions or lead ion complexes, the lead being initially present in the form of lead sulfate prior to the chlorination.

On the other hand, if the aqueous slurry of anode slimes has contained no organic additives when chlorine gas is added thereto according to the present invention, the formation of chloride ions will be limited to the amount required to react with the gold metal present. Accordingly, the aqueous slurry of anode slimes after chlorination will be acidic in pH order, and only a very small quantity of silver and lead present will be dissolved.

Of the various noted techniques for removing copper and selenium from anode slimes, these which involve the dry oxidation of the slimes by roasting and the wet oxidation techniques using autoclaves, the former are preferred in the capacity for removing the organic additives. This is due to the formation of less chloride ions when the aqueous slurry of slimes is treated with chlorine gas and to a smaller dissolution of silver or lead. But even by the wet oxidation techniques using autoclaves, the purposes of the present invention can be sufficiently achieved. According to the next step of the inventive method the anode slimes which have been treated to remove the copper and selenium therein (as well as any organic additives) are dispersed in water to form an aqueous slurry and then chlorine gas is blown therein. The aqueous slurry will be put in a vessel which may be either open or closed, and the aqueous slurry will be usually stirred while the chlorine gas is added. The slimes concentration in the slurry should not be too high because if it is, its pH value will be too low and the added chlorine gas will cause an unpreferable dissolution of silver, lead and like metals.

Chlorine gas is supplied to the aqueous slurry of anode slimes until unreacted chlorine gas appears in bubbles on the surface of the aqueous slurry, or until the chlorine gas pressure in a closed vessel stop dropping. Since the gold in the slimes are in the form of fine particles and thus will be highly reactive with the chlorine, after not more than three hours of treatment with the chlorine at least 99.5% of the gold will have been dissolved from the slimes.

The gold-containing extraction solution is thereafter separated from the residue, and treated with a reducing agent to recover the gold. Suitable reducing agents include a well-known hydrogen peroxide, oxalates, ferrous salts or the like. Using these reducing agents, the gold can be directly recovered in a highly purified state. The solution from which the gold has been recovered can then be passed to another process stage for recovery of the metals of the platinum group. The residue from which the gold-containing extraction solution has been separated will have a very low gold content, e.g., no more than several tens of grams per ton. It can be smelted and the silver can be therefrom. The silver can be concentrated to form a silver anode, which may be later subjected to electrolysis to produce high purity silver.

The present invention will now be described in further detail by reference to the following examples.

EXAMPLE 1

Anode slimes resulting from electrolytic copper refining, containing 18.8% by weight of Cu, 6.2% by weight of Se, 6.8% by weight of Pb, 24% by weight of $H_2O$, 3,430 g/t of Au, and 107,000 g/t of Ag, was dried. Particles having a particle size of 4 to 20 mesh were separated from the slimes, and oxidized by roasting at 700° C. for at least one hour in a rotary kiln. Six kilograms of the roasted slimes were crushed, and treated at 80° C. for one hour with 30 liters of dilute sulfuric acid having a concentration of 250 grams per liter. The acid extraction residue had a dry weight of 1.82 kg.

An aqueous slurry was formed from 1.3 kg of the acid extraction residue and 3.9 liters of water. Chlorine gas was blown into the slurry at a rate of 390 ml/min so that the residue would react with chlorine for three hours at 80° C. No neutralizing agent was added to adjust the pH of the slurry. The solution obtained by the reaction showed a pH value of 1.06. The quantities and chemical analyses of the residue, etc., and the extraction ratio are shown in TABLE 1 below.

TABLE 1

| | Quantity | Composition | | | | |
|---|---|---|---|---|---|---|
| | | Cu | Se | Pb | Ag | Au |
| Acid extraction residue | 1.3 kg | 0.97% | 0.11% | 31.5% | 166,000 g/t | 11,100 g/t |
| Solution after acid extraction | 3.51 liters | 0.51 g/liter | 0.19 g/liter | 0.03 g/liter | Less than 0.001 g/liter | 4.1 g/liter |
| Chlorination residue | 1.15 kg | 0.94% | 0.06% | 35.6% | 187,000 g/t | 31 g/t |
| Extraction ratio | — | 14.2% | 46.9% | 0.03% | 0.00% | 99.7% |

EXAMPLE 2

The procedures of EXAMPLE 1 were repeated, except that slimes containing 14.8% by weight of Cu, 6.0% by weight of Se, 13.9% by weight of Pb, 18% by weight of $H_2O$, 5,010 g/t of Au, and 101,000 g/t of Ag was used, an aqueous slurry was formed from 0.65 kg of the acid extraction residue and 2.0 liters of water, and chlorine gas was blown into the slurry at a rate of 200 ml/min. The solution obtained by the reaction showed a pH value of 1.19. The results are shown in TABLE 2 below.

TABLE 2

| | Quantity | Composition | | | | |
|---|---|---|---|---|---|---|
| | | Cu | Se | Pb | Ag | Au |
| Acid extraction residue | 0.65 kg | 1.93% | 0.02% | 41.2% | 114,000 g/t | 11,800 g/t |
| Solution after acid extraction | 1.90 liters | 0.23 g/liter | Less than 0.01 g/liter | 0.026 g/liter | Less than 0.001 g/liter | 4.04 g/liter |
| Chorination residue | 0.605 kg | 2.00% | Less than 0.01% | 44.2% | 122,000 g/t | 2 g/t |
| Extraction ratio | — | 3.5% | 0.00% | 0.019% | 0.00% | More than 99.9% |

A mixture of the gold-containing extraction solution obtained in EXAMPLES 1 and 2 was reacted directly with an aqueous solution of hydrogen peroxide to yield a reduced gold precipitate containing 99.98% by weight of Au, 1 ppm of Ag, 3 ppm of Pb, 7 ppm of Cu and 130 ppm of Sb. The precipitate was boiled in nitric acid, and the product obtained by solid-liquid separation was melted in a crucible. And then high purity gold containing at least 99.99% by weight of Au, not more than 1 ppm of Ag, not more than 1 ppm of Pb, 1 ppm of Cu, and 2 ppm of Sb was recovered.

EXAMPLE 3

A slurry was formed from 1.6 kg of anode slimes resulting from electrolytic copper refining, containing 13.7% by weight of Cu, 5.3% by weight of Se, 9.6% by weight of Pb, 20% by weight of $H_2O$, 5,000 g/t of Au, and 95,000 g/t of Ag, and four liters of water. The slurry was put in an autoclave and oxidized for one hour at a temperature of 220° C. and an oxygen partial pressure of 10 kg/cm². The slurry thus oxidized was taken out from the autoclave, and extracted by adding 1.6 kg of 98% concentrated sulfuric acid for one hour at 80° C. There was obtained 418 g (dry) of extraction residue containing 0.43% by weight of Cu, 0.20% by weight of Se, 193,000 g/t of Ag, and 19,300 g/t of Au.

An aqueous slurry was formed from 209 g of the acid extraction residue and 630 ml of water. Chlorine gas was blown therein at a rate of 63 ml/min so that the residue would react with chlorine at 80° C. for three hours. The pH was not adjusted. The gold-containing extraction solution showed a pH value of 0.31. Although it had slightly higher silver and lead concentrations, i.e., 0.004 and 0.30 gram per liter, respectively, the solution contained 5 g of gold per liter, and the residue contained 5 g of gold per ton. This meant a gold extraction ratio of at least 99.5%.

The remaining 209 g of the acid extraction residue was likewise treated except the adjustment of its pH value to about 1 with sodium hydroxide during the reaction of gold with chlorine. The solution showed silver and lead concentrations of 0.004 and 0.09 grams, respectively, per liter, and a gold extraction of at least 99.5% was obtained.

COMPARATIVE EXAMPLE 1

The same slimes as employed in EXAMPLE 3 was directly treated with chlorine without removal of copper and selenium. A slurry was formed from 600 g of the slimes and 2.0 liters of water, and chlorine gas was blown into the slurry at a rate of 210 ml/min so that the slimes would react with chlorine at 80° C. for three hours. The solution showed a pH value of 0 or below. The results are shown in TABLE 3.

TABLE 3

| | Composition | | | | | |
|---|---|---|---|---|---|---|
| | Quantity | Cu | Se | Pb | Ag | Au |
| Solution | 2.33 liters | 28.2 g/liter | 10.7 g/liter | 0.83 g/liter | 0.004 g/liter | 1.02 g/liter |
| Residue | 0.191 kg | 0.03% | 0.27% | 23.1% | 238,000 g/t | 105 g/t |
| Extraction ratio | — | 99.8% | 98.0% | 4.19% | 0.02% | 99.5% |

As is obvious from the results hereinabove shown, this invention provides an industrially excellent method which can recover gold at a high yield quickly in one or two days, as opposed to two to three weeks required in prior art processes, and achieves a separation of the gold from the other valuable metals effectively using only a hydrometallurgical method which needs a small and simple apparatus.

We claim:

1. A method of recovering gold from anode slimes generated during electrolytic copper refining, said method comprising the steps of
   (1) removing copper and selenium from said anode slimes;
   (2) adding exclusively water to the anode slimes from which the copper and selenium have been removed in step (1) in order to form an aqueous slurry;
   (3) blowing exclusively chlorine gas into said aqueous slurry of step (2) to dissolve the gold; and
   (4) separating said dissolved gold from the residue.

2. A method as set forth in claim 1, wherein said step (1) comprises
   (a) reacting said anode slimes with air or oxygen in the presence of dilute sulfuric acid;
   (b) treating the reacted slimes obtained in step (a) with water to dissolve copper in an solution and leave an extraction residue; and
   (c) oxidizing the extraction residue obtained in step (b) by roasting at a temperature of 600° C. to 800° C. to volatilize selenium in the form of selenium dioxide.

3. A method as set forth in claim 2 wherein the reaction in step (a) is carried out at atmospheric pressure.

4. A method as set forth in claim 2 wherein the reaction in step (a) is carried out at an elevated temperature and pressure.

5. A method as set forth in claim 1, wherein step (1) comprises
   (a) treating said anode slimes with concentrated sulfuric acid;
   (b) treating the treated slimes obtained in step (a) with water to dissolve copper in an solution and leave an extraction residue; and
   (c) oxidizing the extraction residue obtained in step (b) by roasting at a temperature of 600° C. to 800° C. to volatilize selenium in the form of selenium dioxide.

6. A method as set forth in claim 5 wherein the reaction in step (a) is carried out at atmospheric pressure.

7. A method as set forth in claim 5 wherein the reaction in step (a) is carried out at an elevated temperature and pressure.

8. A method as set forth in claim 1, wherein step (1) comprises treating said anode slimes with an acid in the presence of air or oxygen at a high temperature and a high pressure to simultaneously dissolve copper and selenium.

9. A method as set forth in claim 1, wherein step (1) comprises
   (a) treating said anode slimes with an alkali in the presence of air or oxygen at a high temperature and a high pressure to dissolve selenium in said alkali and leave a residue; and
   (b) extracting copper from the residue obtained in step (a) with dilute sulfuric acid.

10. A method as set forth in claim 1, wherein step (1) comprises
    (a) oxidizing said anode slimes by roasting to volatilize selenium in the form of selenium oxide; and
    (b) extracting copper from said roasted slimes obtained in step (a) with water or dilute sulfuric acid.

11. A method as set forth in claim 10, wherein said roasting is performed in the presence of concentrated sulfuric acid.

12. A method as set forth in claim 1, wherein step (1) comprises
    (a) treating said anode slimes to remove free sulfuric acid;
    (b) forming an aqueous slurry of said treated slimes obtained in step (a) and reacting said slimes with air or oxygen at a high temperature and a high pressure to convert copper and selenium to an acid-soluble substances; and
    (c) extracting said acid-soluble substances with sulfuric acid.

13. A method as set forth in claim 1, wherein said aqueous slurry in step (3) is acidic in pH order.

14. A method as set forth in claim 1, wherein said aqueous slurry is stirred during step (3).

15. A method as set forth in claim 1, wherein said chlorine gas is added to said aqueous slurry in step (3) until bubbles of unreacted chlorine gas appear on the surface of said aqueous slurry.

16. A method as set forth in claim 1, wherein said chlorine gas is added to said aqueous slurry in step (3) until the pressure of said chlorine gas added to said aqueous slurry in a closed vessel stops dropping.

17. A method as set forth in claim 1, further including treating said dissolved gold obtained in step (4) with a reducing agent to obtain high purity gold as a precipitate.

18. A method as set forth in claim 17, wherein said reducing agent is selected from the group consisting of hydrogen peroxide and ferrous salts.

* * * * *